July 7, 1970  G. M. THRONE-BOOTH  3,519,805
VEHICLE STOPPING CONTROL APPARATUS
Filed Nov. 29, 1967  2 Sheets-Sheet 1

WITNESSES
Theodore F. Wrobel
James F. Young

INVENTOR
George M. Thorne-Booth
BY T. M. Brodahl
ATTORNEY

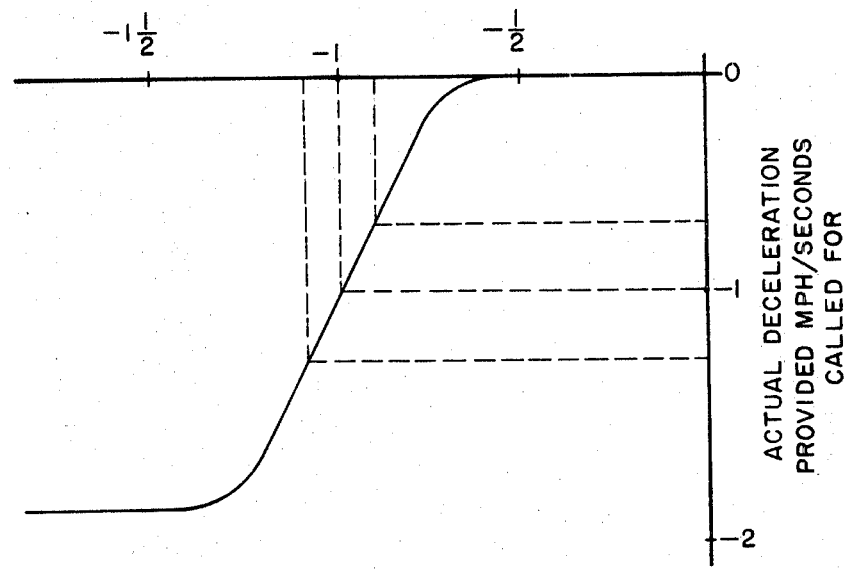
FIG. 4.
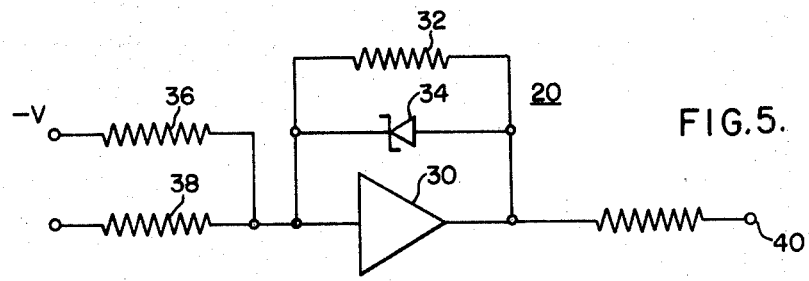
FIG. 5.
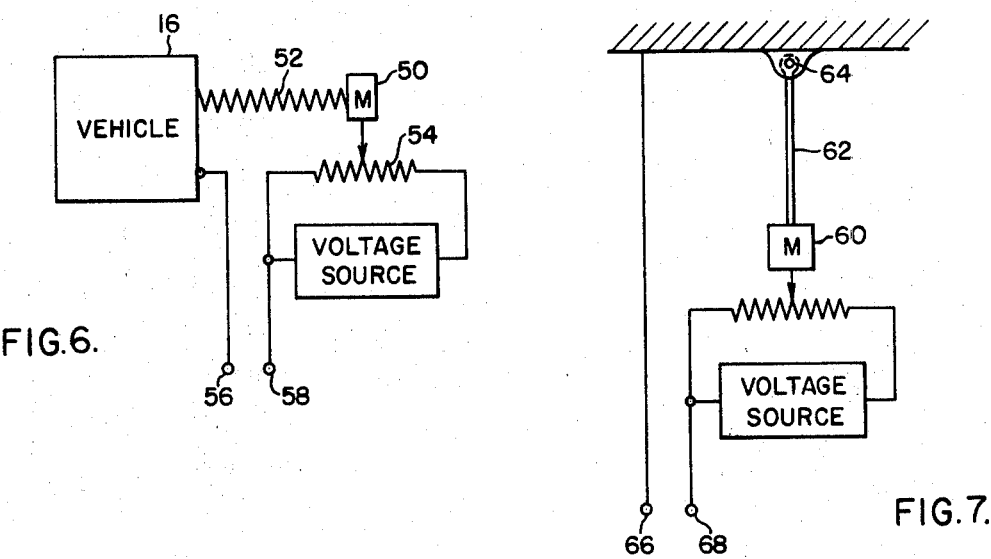
FIG. 6.
FIG. 7.

United States Patent Office 3,519,805
Patented July 7, 1970

1

3,519,805
VEHICLE STOPPING CONTROL APPARATUS
George M. Thorne-Booth, Murrysville, Pa., assignor to Westinghouse Electric Corporation, Pittsburgh, Pa., a corporation of Pennsylvania
Filed Nov. 29, 1967, Ser. No. 686,512
Int. Cl. G06g 7/12; B60t 13/66
U.S. Cl. 235—150.2                13 Claims

ABSTRACT OF THE DISCLOSURE

This invention relates to an improved vehicle stopping control apparatus operative to obtain a desired smooth and comfortable precise stopping of a vehicle, such as a passenger vehicle, in accordance with a predetermined movement control profile curve. A vehicle acceleration-sensitive closed loop control system is provided wherein the vehicle is decelerated in accordance with a first predetermined relationship when an interim distance $d_0$ is reached prior to the desired stopped location of the vehicle, and a second predetermined deceleration relationship is then followed until the vehicle is stopped at the desired location $d_1$. A non-linear signal circuit is included within the closed loop control system to improve the desired and programmed stop of the vehicle at the desired position.

BACKGROUND OF THE INVENTION

In the programmed control of moving vehicles, such as in particular a passenger elevator or a passenger train vehicle, and where the operation of the vehicle is determined by automatic control equipment, it is important that the vehicle operate in a predetermined manner as required for the safety and the comfort of involved property and passengers. One important requirement is obtaining a smooth and comfortable vehicle stopping profile in accordance with a predetermined stopping position and in accordance with desired deceleration and minimum time requirements. Further it is desirable to use average accuracy and reasonable cost vehicle motion and position sensing instruments and reasonable operational characteristic and cost vehicle braking equipment.

SUMMARY OF THE INVENTION

In accordance with the present invention there is provided vehicle stopping control apparatus operative to sense the momentary deceleration of the vehicle, the position of the vehicle in relation to a desired stopped position and the movement velocity of the vehicle to effect a predetermined stopping profile of high accuracy and minimum time which does not require unreasonably accurate vehicle parameter sensing instruments and is capable of suitable control with the ordinary vehicle braking equipment in common usage at the present time. A vehicle acceleration closed loop control system is operative with the vehicle, such that vehicle actual acceleration or deceleration is fed back for comparison with a desired vehicle acceleration or deceleration. The desired acceleration or deceleration is determined in accordance with the actual position of the vehicle in relation to the predetermined and desired stop position and in accordance with the actual velocity of the vehicle. A non-linear signal responsive element is included in the involved control circuit prior to the signal comparison circuit for anticipation of probable output signal inaccuracies of the required sensing instruments and for compensating the effective operation of the control apparatus as required.

2

BRIEF DESCRIPTION OF DRAWINGS

FIG. 4 illustrates the operating characteristic of the provided non-linear circuit device;

FIG. 5 is a schematic showing of the non-linear circuit device;

FIG. 6 is one suitable form of the vehicle acceleration sensing device; and

FIG. 7 is illustrative of another suitable form of the vehicle acceleration sensing device.

DESCRIPTION OF PREFERRED EMBODIMENT

Figure 1:
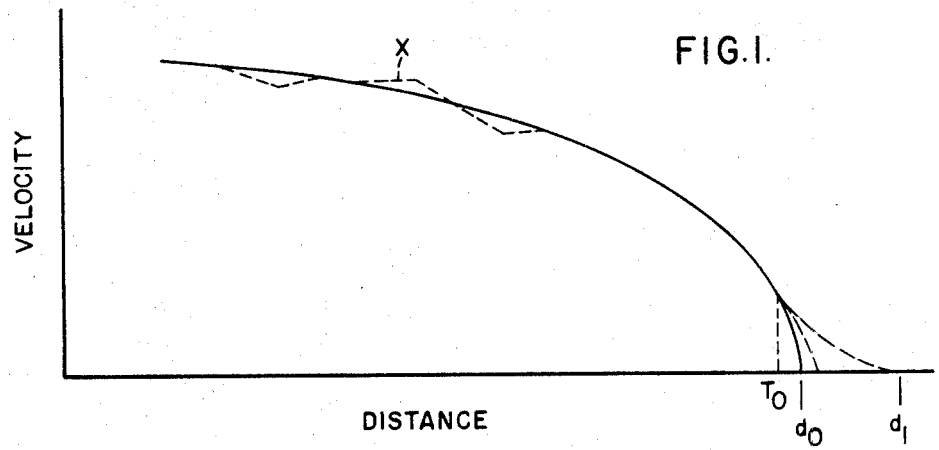
FIGURE 1 is a curve provided to illustrate a typical desired vehicle stopping profile to be obtained in accordance with the teachings of the present invention.

In FIG. 1 there is shown a curve plot of vehicle velocity in relation to movement distance and illustrating the desired deceleration profile to obtain a stopping of the vehicle at location $d_1$. The location $d_0$ is a virtual stopping point positioned a known distance short of the final desired stopping point $d_1$.

Figure 2:
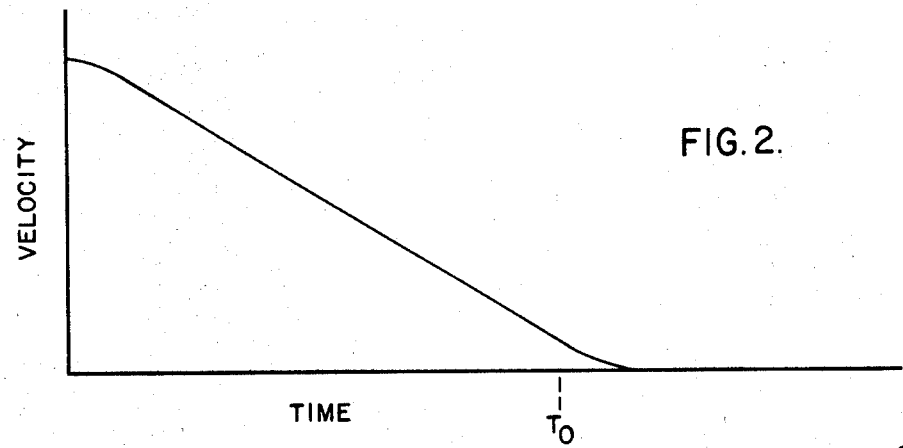
FIG. 2 is a curve provided to illustrate the desired substantially constant deceleration vehicle operation obtainable with the present control apparatus.

In FIG. 2 there is shown a curve to illustrate the desired substantially constant deceleration vehicle operation obtainable in accordance with the teachings of the present invention and illustrating the change of deceleration at time $T_0$ corresponding to the vehicle location at $T_0$ shown in FIG. 1. This velocity change illustrates the flare-out provided in the control profile between the locations $d_0$ and $d_1$, shown in FIG. 1, for the purpose of passenger comfort and to limit jerk operation of the vehicle.

Figure 3:
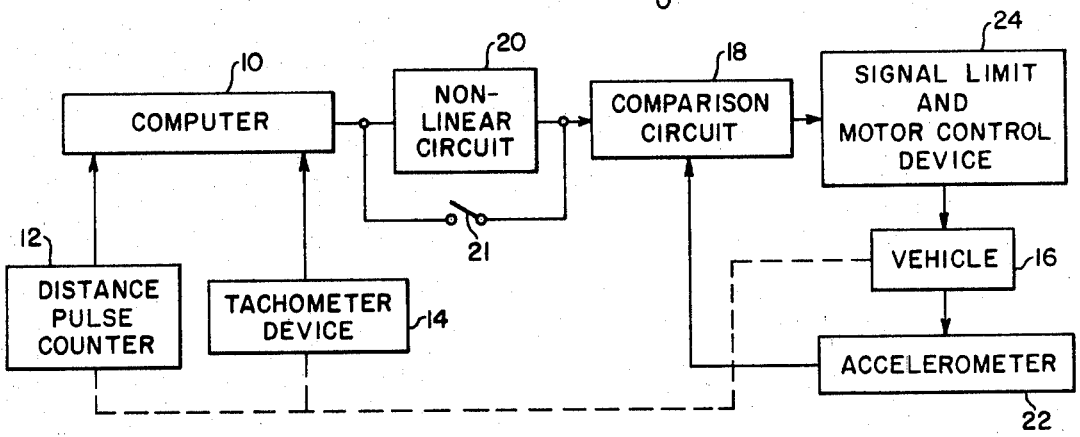
FIG. 3 is a diagrammatic showing of one form of the present control apparatus.

In FIG. 3 there is shown diagrammatically one form of the present control apparatus including a computer 10 responsive to a signal from a vehicle movement distance pulse counter 12 in accordance with the actual travel distance of the vehicle and to be compared by the computer with the desired stopping location or desired travel distance and a signal from a tachometer device 14 operative with the vehicle 16 and providing an output signal in accordance with the movement velocity of the vehicle 16. The computer 10 in accordance with the travel distance signal from the counter 12 and the velocity signal from the tachometer 14 provides a reference or desired deceleration signal to a signal comparison circuit 18. Connected between the computer 10 and the signal comparison circuit 18 is a non-linear circuit 20, which will be later described, or a switch 21 can be closed to bypass the non-linear circuit 20. The operation of the signal comparison circuit 18 is such that a reference deceleration signal is compared to the actual deceleration signal from an accelerometer 22 operative with the vehicle 16 for providing an acceleration error signal to a signal limit and motor control device 24, which is operative as a signal amplifier circuit and provides a limited value output signal to control the jerk condition of the vehicle such that the comfort of passengers riding in the vehicle 16 is thereby assured.

In FIG. 4 there is shown the operating characteristic of a typical non-linear circuit 20 and operative such that the reference deceleration signal from the computer 10 passes through the non-linear circuit 20 as follows. For a reference deceleration desired that is smaller in magnitude than $-\frac{1}{2}$, there is provided by the circuit an output of 0 actual deceleration. As the reference signal from the computer becomes greater in magnitude, the circuit calls for more deceleration at a greater rate of change than the rate of change of the reference signal such that there is provided, at a reference of −1, an actual deceleration of −1. The other words, and as shown by the curve of FIG. 4, at a reference deceleration of −½ an output of 0 deceleration is called for by the non-linear circuit 20; as the reference deceleration goes from −½ to −1, the actual deceleration provided changes from 0 to −1 to provide a gain of 2 in the region around the desired operating point of −1. This gain could be changed if desirable by making the selected breakpoint −¾ for example; then as the reference deceleration called for by the computer goes from −¾ to −1 the circuit would provide an actual deceleration of 0 to −1 to give an effective gain of 4 in this region; the same operation would hold true for the opposite side of the curve beyond −1. In this way the desired operating point is chosen to be −1 where the input and output are equal, and circuit 20 operates as a selective gain circuit to select the desired gain around that point with the gain below −½ and above −1½ to be zero as shown in FIG. 4.

If the non-linear circuit 20 shown in FIG. 3 is removed by closing switch 21, a gain of unity is provided around the operating point and no break points are present, such that when the reference deceleration called for by the computer 10 goes from 0 toward −1 and then toward −2, the actual deceleration provided to the comparison circuit 18 follows in the same manner from 0 toward −1 and then toward −2 without modification.

The operating characteristics shown in FIG. 4 will be explained in greater detail in reference to the circuit shown in FIG. 5.

In FIG. 5 there is provided a schematic showing of one well known form of a suitable non-linear circuit 20. The amplifier 30 includes a feedback resistor 32 and a feedback Zener diode device 34 poled as shown in FIG. 5. A first input resistor 36 is connected to a negative voltage source, for example −10 volts. A second input resistor 38 receives the output signal from the computer 10. The output terminal 40 of the non-linear circuit 20 is connected to the signal comparison device 18. The amplifier 30 includes a connection to a positive power supply. This circuit is operative, as well known to persons skilled in this art, to provide the operational characteristic shown in FIG. 4.

In FIG. 6 there is shown one form of a vehicle acceleration sensing device comprising a mass 50 supported by a spring 52 such that as the vehicle 16 accelerates to the left as shown in FIG. 6 the mass 50 will lag in its movement relative to the resistor 54 attached to the vehicle such that there will be supplied an output signal from the terminals 56, 58. In accordance with the acceleration of the vehicle 16 to the left, the same is true if the vehicle 16 accelerates to the right. The mass 50 will lag in its movement to the right as a function of the acceleration of the vehicle 16 to provide a corresponding output signal from the terminals 56 and 58.

In FIG. 7 there is shown another form of vehicle acceleration sensing device which comprises a mass 60 pivotally supported by an arm 62 about a pivot point 64 attached to the vehicle such that as the vehicle accelerates to the left or to the right, the mass 60 will be influenced in a manner to lag the movement of the vehicle and thereby provide an output signal through the terminals 66 and 68.

In accordance with the teachings of the present invention to obtain a smooth and comfortable stopping profile for a passenger vehicle, said profile having high accuracy and minimum time characteristics and which do not require the use of unusually accurate instruments or precisely adjusted braking characteristics, an acceleration loop control system has been provided to control the passenger vehicle which control system is shown in FIG. 3. The computer 10 calculates the reference control signal in accordance with the following expression:

$$\text{Deceleration signal} = \frac{K_1 v^2}{2(d-d_0)}$$

which expression provides a reference acceleration or deceleration signal as may be required to stop the vehicle at position $d_0$ at a constant deceleration as shown in FIG. 2, with the value of the constant deceleration being determined by the predetermined constant K as limited by passenger comfort, where $d_0$ is a virtual stopping point positioned a little short of the final desired stopping location $d_1$ as shown in FIG. 1. At a positional location which is short of position $d_0$ by an amount of $3(d_0-d_1)$ the calculation by the computer 10 is changed to reference deceleration equals:

$$\text{Deceleration signal} = \frac{2K_1 v^2}{3(d-d_1)}$$

which is the required expression to stop at constant jerk and with the value of this constant jerk being limited by passenger comfort and determined by the magnitude of the distance $(d_0-d_1)$ and operative such that the larger this distance then the lower the value of the vehicle jerk. The computer 10 may comprise either an analog computer or a digital computer and it in fact provides a very simple function to obtain. In order to insure passenger comfort, a jerk limit circuit is included within the signal limit and motor control device 24, with the value of same being said to give good passenger comfort but some 15% to 25% faster than that called for in the final stopping profile flare-out, to insure that the flare-out is controlled by the computation and not by the provided jerk limit circuit.

The non-linear circuit 20 shown in FIG. 3 has been connected between the computer 10 and the signal comparison element 18 of the control loop for the purpose of significantly reducing the required accuracy of the tachometer and accelerometer instrumentation and to reduce the required accuracy of the computation. It should be here noted that the vehicle motion sensing tachometer may be effected by wheel slippage and further the braking characteristics of typical vehicle brakes such as airbrakes are not linear in operation. Additionally a tachometer device characteristically loses its accuracy at low speeds and may have an error as great as one mile per hour at a vehicle velocity of one mile per hour, while the accelerometer loses its accuracy at higher vehicle speeds. The non-linear circuit 20 is operative to adjust both zero and scale error for the accelerometer 22 and adjust for scale error for the tachometer device 14. The non-linearity circuit 20 makes the predetermined and programmed stop of the vehicle feasible because otherwise there would be overrunning of the vehicle position due to these inherent errors of the vehicle movement sensing instruments. It is intended in accordance with the operation of the present invention that for the final 300 feet or so, as a typical example, of vehicle movement prior to arriving at the desired location $d_1$, the computer 10 will be operative to check the acceleration control error in accordance with the teachings of the present invention.

More specifically if the computer 10 when it senses the actual movement distance of the vehicle relative to the desired stopping distance $d_1$ senses the actual velocity of the vehicle 16, a reference deceleration will be computed which for example may be −1 mile/hour/sec. With the switch 21 open as shown in FIG. 3, the non-linear circuit 20 will be operative such that an output desired or reference deceleration signal of −1 mile/hour/sec. will be provided to the signal comparison device 18 and will cause the vehicle, due to the high gain amplifier characteristics of the signal limit and motor control device 24, to decelerate until the output signal from the accelerometer 22 is −1 mile/hour/sec. However, due to instrument error on the part of the accelerometer 22 the actual speed of the vehicle may at this time be —0.9 mile per hour per second such that the vehicle is not in fact decelerating at one mile per hour per second as desired. Therefore as shown at X in FIG. 1 the velocity vs. distance plot will deviate from the desired profile. This will cause the computer 10 to request an increase in deceleration for example, —1.1 mile per hour per second. As shown in FIG. 4, when the computer 10 supplies a reference deceleration signal of —1.1 mile per hour to the non-linear circuit 20, the output of the non-linear circuit 20 is —1.2 mile per hour per second, which then causes the vehicle to change its deceleration such that the accelerometer 22 provides an output signal of —1.1 mile per hour per second deceleration to the signal comparison circuit to provide a proper error signal from the signal comparison circuit 18 to maintain the desired actual deceleration.

On the other hand, if the circumstances should be such that the computer calculates a reference deceleration of —0.9 mile per hour per second and supplies this signal to the input of the non-linear circuit 20, as shown in FIG. 4 the output of the non-linear circuit 20 will be —0.7 mile per hour per second deceleration which is supplied to the signal comparison circuit 18. This will cause the signal limit and motor control device to decrease the movement of the vehicle 16 such that an actual deceleration of —0.9 mile per hour per second will be reached, at which time the accelerometer will provide a signal of —0.8 mile per hour per second to the signal comparison circuit which will provide a proper error signal to maintain the desired deceleration. In a similar manner, instrument errors in the operation of the tachometer device 14 and the distance pulse counter 12 and associated circuitry and apparatus are compensated for by the non-linear characteristic of the non-linear circuit 20.

Without the non-linear circuit 20, as effected as the switch 21 is closed, suppose that a scaling error exists in the accelerometer 22 such that the output is reading high and for a reading of —1 mile per hour per second, the actual acceleration is only —0.9 mile per hour per second, then as the vehicle 16 nears the stopping point it is continuously decelerating at too low a rate, and the reference deceleration is continuously rising in an attempt by the computer 10 to correct this positional error which is now accumulating. Since there is a scaling error in the accelerometer and a finite gain in the braking control loop however, the vehicle is never decelerating at the reference rate and inevitably the braking capability is finally exceeded and the vehicle will overshoot. When the switch 21 is open to include the non-linear circuit 20, assume that a constant deceleration of —1 mile per hour per second is the reference deceleration, but the same scaling error exists in the accelerometer 22 as set forth previously. At an early stage in the stopping profile, an acceleration of —1 mile per hour per second is demanded, but the vehicle actually decelerates at something less than that for example, —0.8 mile per hour per second, because of the scaling error of the accelerometer and also because of the finite gain of the braking loop. At a point somewhat closer to the aiming point because of this lower deceleration in the early part of the profile, the computer 10 demands a higher deceleration for example, —1.1 miles per hour per second and the operation of the non-linear circuit 20 modifies this computed demand to a higher value in order of —1.3 miles per hour per second and the actual deceleration is now about —1.04 miles per hour per second.

This can be explained by assuming that because of errors the overall control system, including the train as an element and the instruments, will achieve about 80% of the deceleration requested. Therefore, without the non-linear circuit 20, when the computer requests a reference deceleration of —1, the actual achieved deceleration would be about —0.8. To overcome this operation, when the computer sets a desired reference deceleration of —1.1 miles per second, the non-linear circuit 20 changes this to a reference deceleration of —1.3. The complete system including the train gives a deceleration of —1.3×.80 or —1.04; since this is still not enough, the computer requests more deceleration which is scaled up even higher by the non-linear circuit 20. When the computer finally asks for a deceleration of —1.14, the non-linear circuit converts this to a reference deceleration of about —1.42. The complete system including the train achieves an actual deceleration of about —1.42×0.80 or —1.136 which is very close to the desired deceleration of —1.14 requested by the computer. The control system is seen to then stabilize somewhere very near to this level of operation. At this deceleration level then the vehicle will hold following the desired profile for this demanded deceleration.

From the descriptions of the last four paragraphs, it will be appreciated that non-linear circuit 20 provides a modified profile signal having the quality to reduce deviation of the actual stopping operation from the desired profile, albeit the deviation arises as the result of a variety of different causes.

When the vehicle reaches a location short of the virtual stopping point $d_0$ by an amount of three times the quantity $(d_0-d_1)$ the computer changes its calculations and the non-linearity circuit 20 is cut out by the computer being effective to close the switch 21. Because the vehicle is now very close to the stop point $d_1$ and moving in a very narrow range of velocity and acceleration, possible errors in the final stop point are small and the computer 10 will satisfactorily bring the vehicle to a stop at substantially the location $d_1$. It can be shown that the non-linear circuit corrects for zero and scale errors of the accelerometer and scale errors of the tachometer, instrument errors of the computation and errors caused by the finite and variable gain of the braking components. The computer is programmed in accordance with the final stopping position $d_1$, the virtual stopping point $d_0$ and the predetermined and known braking characteristic and passenger comfort constant K.

The actual position of the vehicle in relation to a desired stopping location, such as a station platform, can be monitored for a predetermined distance such as the last 300 feet of travel prior to arriving at this desired stopping location by a position signal providing apparatus including a pair of transmission cables laid between the track rails for this predetermined distance out from the station platform. This pair of cable is provided with physical crossovers at regular intervals such as every 12 inches, to provide position control signals in cooperation with a pair of train vehicle carried antennas spaced 6 inches apart to enable a measurement in this way of train vehicle position and the train vehicle velocity in relation to the station platform and the desired stopping location.

The present invention has been described with a certain degree of particularity, however, it should be understood that various modifications and changes can be made in the arrangement and operation of the individual parts without departing from the scope and the spirit of the present invention.

I claim as my invention:

1. In apparatus for stopping a vehicle in accordance with a desired substantially constant deceleration profile, said apparatus being operatively associated with first means to sense actual position of said vehicle in relation to a desired stopping location for the vehicle, and operatively associated with second means to sense actual velocity of the vehicle, the combination of:

calculating means operative to derive a profile reference signal calling for said desired constant deceleration, said signal derived in accordance with a predetermined calculation involving such actual position of said vehicle and said actual velocity of said vehicle, a selective gain circuit operative to translate said profile reference signal to a modified profile reference signal having a desired quality effective to reduce deviation of actual vehicle operation from said desired deceleration profile, and vehicle acceleration control means operative to control vehicle deceleration in response to said modified profile reference signal.

2. Apparatus in accordance with claim 1, wherein;
said selective gain circuit has a deceleration signal translation curve having a desired curve operating point equal to the desired deceleration, said curve being operative to translate an input signal at said point with unity gain and being operative to translate an input signal deviating from said point with amplification of the magnitude of deviation.

3. Apparatus in accordance with claim 1, wherein;
said predetermined calculation is based upon the general formula $$deceleration = v^2/2d$$

where $v$ is vehicle velocity and $d$ is the distance-to-go to a nominal stopping location.

4. Apparatus in accordance with claim 1 wherein;
said selective gain circuit has a deceleration signal translation curve having a desired curve operating point equal to the desired deceleration and having a first region including said point and extending to one and the other side of the point which is operative to provide a predetermined effective gain and having second and third regions to one and the other sides of the first region which are operative to provide lower effective gains.

5. Apparatus in accordance with claim 4, wherein;
said translation curve further has a region below a predetermined deceleration limit which is operative to provide zero output.

6. Apparatus in accordance with claim 1 in which said apparatus is further operatively associated with a third sensing means to sense actual deceleration of the vehicle, and wherein said vehicle acceleration control means includes:
means for deriving an acceleration error signal in accordance with the difference between the deceleration called for by the modified profile reference signal and the actual vehicle deceleration, and
means for controlling vehicle operation to reduce the acceleration error signal to zero.

7. In control apparatus for stopping a vehicle at a desired stopping location in accordance with a desired deceleration profile, said apparatus operatively associated with position sensing means for providing a position signal representative of actual vehicle position relative to said desired stopping location for that vehicle, and operatively associated with velocity sensing means for providing a velocity signal representative of actual vehicle velocity, the combination of:
signal means operative to derive from said position and velocity signals a profile reference signal calling for said desired deceleration profile,
selective gain means operative to translate said profile reference signal to a modified profile reference signal having a desired quality effective to reduce deviation of actual vehicle operation from said desired deceleration profile, and
vehicle acceleration control means operative to control vehicle deceleration in response to said modified profile reference signal.

8. Apparatus in accordance with claim 7 in which said desired control profile is a desired substantially constant deceleration, and wherein;
said profile reference signal calls for said desired deceleration, and
said selective gain means has a deceleration signal translation curve having a desired operating point equal to the desired deceleration, said curve being operative to translate an input signal at said point with unity gain and being opertaive to translate an input signal deviating from said point with amplification of the magnitude of deviation.

9. In apparatus for stopping a vehicle in accordance with a desired change of movement profile, said apparatus being operatively associated with first means to sense actual position of said vehicle in relation to a desired stopping location for the vehicle, and operatively associated with second means to sense actual movement of the vehicle, the combination of:
calculating means operative to derive a profile reference signal calling for said desired change of movement profile, said signal derived in accordance with a predetermined calculation involving such actual position of said vehicle and actual movement of said vehicle,
a selective gain circuit operative to translate said profile reference signal to a modified profile reference signal having a desired quality effective to reduce deviation of actual vehicle operation from said desired change of movement profile, and
vehicle movement control means operative to control change of movement of the vehicle in response to said modified profile reference signal.

10. In apparatus for stopping a vehicle at a desired stopping location in accordance with a desired deceleration profile which includes an initial portion having a desired substantially constant vehicle deceleration profile and a remaining portion having a desired decreasing deceleration profile, said apparatus operatively associated with means for sensing position of said vehicle in relation to said desired stopping location, the combination comprising:
vehicle acceleration control means operative to control vehicle deceleration in response to a deceleration reference signal,
deceleration programming means having first and second operations performed in operation intervals defined by predetermined relations to such position of the vehicle,
said first operation being to provide to said vehicle acceleration control means a first profile reference signal calling for said desired deceleration during an initial predetermined distance of vehicle travel prior to arrival at said stopping location, and
said second operation being to provide to said vehicle acceleration control means a second profile reference signal calling for said desired decreasing deceleration profile during the remaining predetermined distance of travel prior to arrival at said stopping location.

11. Apparatus in accordance with claim 10 in which said apparatus is further operatively associated with means for sensing velocity of the vehicle, and wherein:
said programming means is a calculating means operative to derive the first and second profile signal in accordance with first and second predetermined calculations each involving such position of the vehicle and said velocity of the vehicle.

12. Apparatus in accordance with claim 10, and;
a selective gain circuit operative to modify said first profile reference signal to reduce deviation of actual vehicle operation from said desired substantially constant deceleration profile,
said deceleration programming means further having a third operation to apply the first profile reference signal to the vehicle acceleration control means through said selective gain circuit during a predetermined interval of said initial predetermined distance of vehicle travel.

13. Apparatus in accordance with claim 12, wherein:
said selective gain circuit has a deceleration signal translation curve having a desired curve operating point equal to the desired deceleration, said curve being operative to translate an input signal at said point with unity gain and being operative to translate an input signal deviating from said point with amplification of the magnitude of deviation.

References Cited

UNITED STATES PATENTS

| | | | |
|---|---|---|---|
| 2,996,137 | 8/1961 | Chu et al. | 180—98 |
| 3,240,929 | 3/1966 | Hughson | 246—167 |
| 3,334,224 | 8/1967 | Allen et al. | 246—187 |
| 3,361,905 | 1/1968 | Baughman | 246—187 |
| 3,362,757 | 1/1968 | Marcheron | 303—21 |
| 3,406,775 | 10/1968 | Magnuski | 180—105 |

OTHER REFERENCES

Kilb, Automatic Control of Braking, "The Railway Gazette," Oct. 16, 1964, pp. 859–862 and 864, 246–182 (B).

Ito, Discontinuous Control Stops Train Accurately, "Control Engineering," January 1961, pp. 90–93, 235–150.2.

MALCOLM A. MORRISON, Primary Examiner

R. W. WEIG, Assistant Examiner

U.S. Cl. X.R.

303—20; 246—182